United States Patent
Bronicki

(10) Patent No.: US 9,769,099 B2
(45) Date of Patent: Sep. 19, 2017

(54) SYSTEMS AND METHODS OF HANDLING EMAIL COMMUNICATION

(71) Applicant: Youval Bronicki, Los Altos, CA (US)

(72) Inventor: Youval Bronicki, Los Altos, CA (US)

( * ) Notice: Subject to any disclaimer, the term of this patent is extended or adjusted under 35 U.S.C. 154(b) by 274 days.

(21) Appl. No.: 14/638,933

(22) Filed: Mar. 4, 2015

(65) Prior Publication Data

US 2016/0261531 A1   Sep. 8, 2016

(51) Int. Cl.
*G06F 15/16* (2006.01)
*H04L 12/58* (2006.01)
*H04L 29/08* (2006.01)

(52) U.S. Cl.
CPC ............ *H04L 51/12* (2013.01); *H04L 67/306* (2013.01)

(58) Field of Classification Search
CPC ....................................................... H04L 51/12
See application file for complete search history.

(56) References Cited

U.S. PATENT DOCUMENTS

| | | | |
|---|---|---|---|
| 6,697,462 B2 | 2/2004 | Raymond et al. | |
| RE40,992 E | 11/2009 | Cartmell et al. | |
| 8,046,832 B2 | 10/2011 | Goodman et al. | |
| 2002/0099654 A1* | 7/2002 | Nair ...................... | G06Q 20/102 705/40 |
| 2004/0003283 A1* | 1/2004 | Goodman ............ | G06Q 10/107 726/30 |
| 2005/0182735 A1* | 8/2005 | Zager ..................... | G06Q 20/04 705/67 |

OTHER PUBLICATIONS

Wikipedia article, Ajax (programming)(2014).
Boxbe—Welcome to the future of email (2007).
Boxbe home page—Say to goodbye to email overload. Say hello to Boxbe (2012).
Dyson, Caveat Sender!, Project Syndicate—The World's Opinion Page (2013).
CruelMail, We Make the Spammers Pay (2002).
Wikipedia's article, Cryptographic hash function (2014).
Wikipedia article, Email (2014).
Gmail application interface (API) at https://developers.google.com/gmail/api/ (2014).

(Continued)

*Primary Examiner* — Brian Whipple
(74) *Attorney, Agent, or Firm* — Robert Moll

(57) ABSTRACT

The invention relates to systems, methods and computer-readable medium for handling email communications. A system includes server(s) configured to execute a recipient registration and profile maintenance component that stores recipient registration details including a recipient-required donation amount; an email processing component that (a) receives an email message, (b) determines a sender key representing a sender of the email message, (c) checks the sender key to determine if the sender is recipient-approved, (d) stores the email message in an inbox of the recipient if the sender is recipient-approved, and (e) if the sender is not recipient-approved, stores the email message in a pending donation space of the recipient and emails a donation request to the sender; and a donation confirmation processing component that receives a donation confirmation and stores the email message in a post donation space of the recipient.

21 Claims, 9 Drawing Sheets

(56) References Cited

OTHER PUBLICATIONS

Paypal article, How to Make Parallel Payments Using Express Checkout (2014).
Paypal article, Implementing Parallel Payments (2014).
The Internet Engineering Task Force (IETF) Request for comments RFC 6749 (2012).
Introduction—Gmail API—Google Developers (2014).
Wikipedia article, OAuth (2014).
Wikipedia article, Email filtering (2014).
Spam and suspicious email—Gmail Help (2014).
Tanenbaum, Computer Networks (5th Edition 2011).
Hennessy and Patterson, Computer Architecture: A Quantitative Approach (2012).
Patterson and Hennessy, Computer Organization and Design: The Hardware / Software Interface (2013).
Anderson, et al., Operating Systems—Principles and Practice, Second Edition (2011-2014).
Bovet and Cesati, Understanding the Linux Kernel (2005).
Lowe et al. Mastering VMware vSphere 5.5 (2013).
Matthews et al., Running Xen: A Hands-On Guide to the Art of Virtualization (2008).
Murty, Programming Amazon Web Services: S3, EC2, SQS, FPS, and SimpleDB (2008).
Sanderson, Programming Google App Engine (2012).
Rockoff, The Language of SQL: How to Access Data in Relational Databases (2010).
Redmond et al., Seven Databases in Seven Weeks (2012).
Wikipedia article, Web Application Framework (2014).
Excellent K-9 mail app for Android keeps your messages on a leash (2011).
K-9 mail source code at https://github.com/k9mail/k-9 (2015).

* cited by examiner

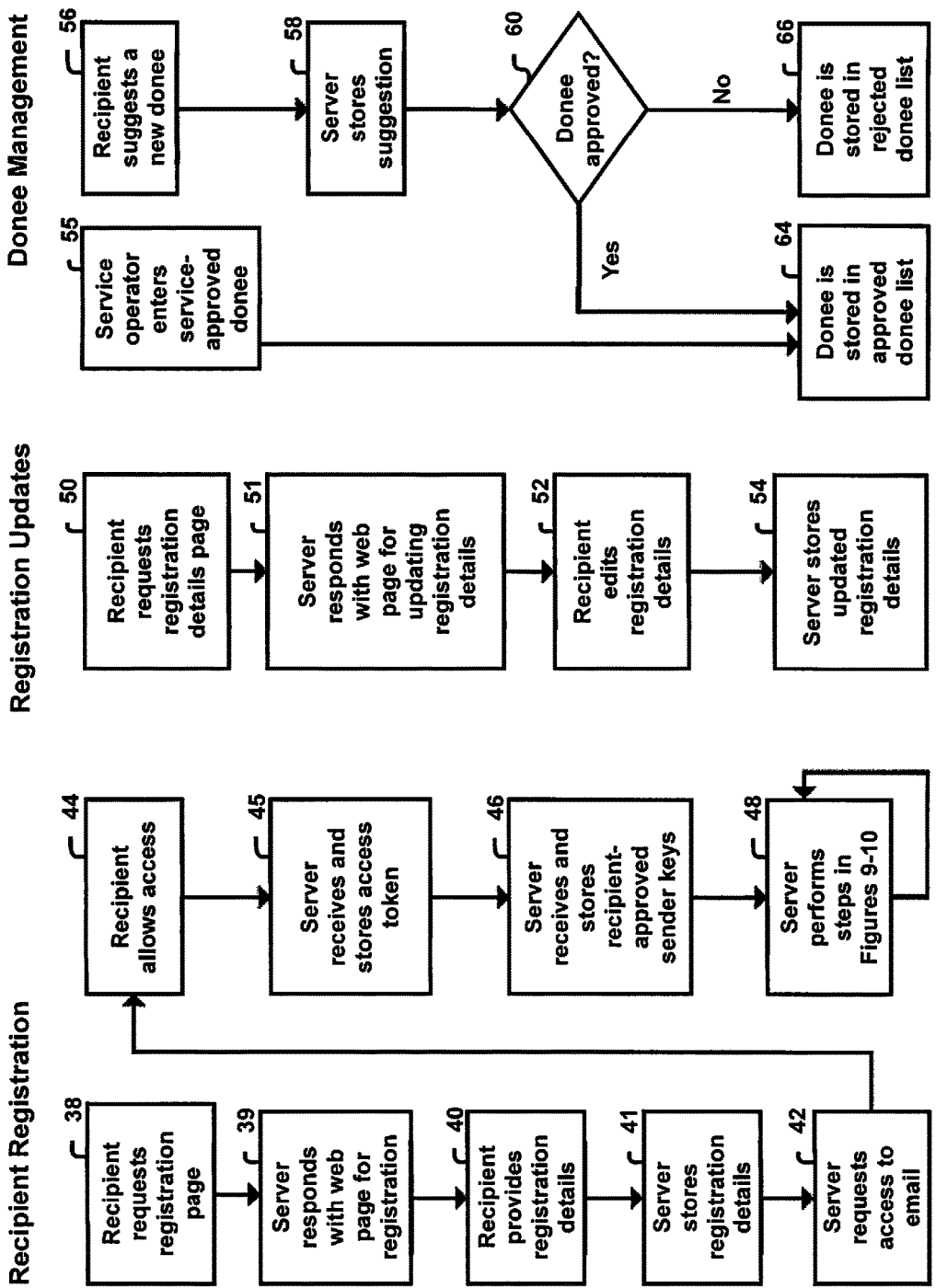

Automatic update of recipient-approved senders

US 9,769,099 B2

SYSTEMS AND METHODS OF HANDLING EMAIL COMMUNICATION

BACKGROUND

The invention relates to methods and systems for handling electronic mail communication.

Electronic mail (email) is a widespread communication system, used to exchange messages over computer networks (primarily the Internet). With email, a sender (or author) can send a message to one or more recipients quickly and at almost no cost.

The email system uses an open global addressing framework and a store-and-forward communication model based on open standards (e.g., SMTP, IMAP, and POP3). Tanenbaum, Computer Networks, at pages 623-646 (2011) and the Wikipedia article Email (2014), which are incorporated by reference herein, describe details of email messaging systems.

Each participant in the system has an email address typically composed of a user name and a domain name (e.g., john.doe@somecompany.com).

Each email address is associated with one or more email servers that handle incoming and outgoing communication on its users' behalf.

The low cost and ease of use of email result in a problem of information overload—knowledge workers often spend a significant part of their day going through email messages. Email systems give users a variety of mechanisms (e.g., spam filters, folders, labels, tabs, and rules) to help cope with the overload. These mechanisms may not distinguish between superficially similar email messages that have considerably different value to the sender and the recipient. For example, in an academic setting, an invitation to speak at a seminar may be sent to a few highly relevant recipients, or to hundreds or even thousands of recipients with the hope that some of them will accept the invitation. The former case indicates a higher relevance to the recipient than the latter case, but it's difficult for the email server or the recipient to assess the relevance just by reviewing the email message (e.g., checking for suspicious content) or the message headers (e.g., checking for email servers known to transmit spam).

SUMMARY OF THE INVENTION

The invention relates to systems for handling email communication. In an embodiment, server(s) are configured to execute a recipient registration and profile maintenance component that stores registration details of a recipient; an email processing component that (a) receives an email message, (b) determines a sender key representing a sender of the email message, (c) checks the sender key to determine if the sender is recipient-approved, and (d) if the sender is not recipient-approved, stores the email message in a pending donation space of the recipient and emails a donation request to the sender; and a donation confirmation processing component that receives a donation confirmation and stores the email message in a post donation space of the recipient.

The invention relates to methods for handling email communication. In an embodiment, the method includes receiving an email message sent to a recipient, determining a sender key representing a sender of the email message, checking the sender key to determine if the sender is recipient-approved, if the sender is not recipient-approved, emailing a donation request to the sender, and if the email message is not already in a pending donation space of the recipient, storing the email message in the pending donation space of the recipient, receiving a donation confirmation, and storing the email message in a post donation space of the recipient.

The present invention also relates to a non-transitory computer-readable medium that encodes a program for handling email communication, including receiving an email message sent to a recipient, determining a sender key representing a sender of the email message, checking the sender key to determine if the sender is recipient-approved, if the sender is not recipient-approved, emailing a donation request to the sender, and storing the email message in a pending donation space of the recipient, receiving a donation confirmation, and storing the email message in a post donation space of the recipient.

BRIEF DESCRIPTION OF THE DRAWINGS

FIG. 5 illustrates an embodiment of recipient registration.

FIG. 6 illustrates an embodiment of registration updates.

FIG. 7 illustrates an embodiment of donee management.

DETAILED DESCRIPTION OF THE PREFERRED EMBODIMENTS

The following description includes the best mode of carrying out the invention. The detailed description illustrates the principles of the invention and should not be taken in a limiting sense. The scope of the invention is determined by reference to the claims. Each part (or step) is assigned its own part (or step) number throughout the specification and drawings. The method drawings illustrate a specific sequence of steps, but some of the steps can be performed in parallel and/or in different sequence to achieve the same result.

Figure 1:
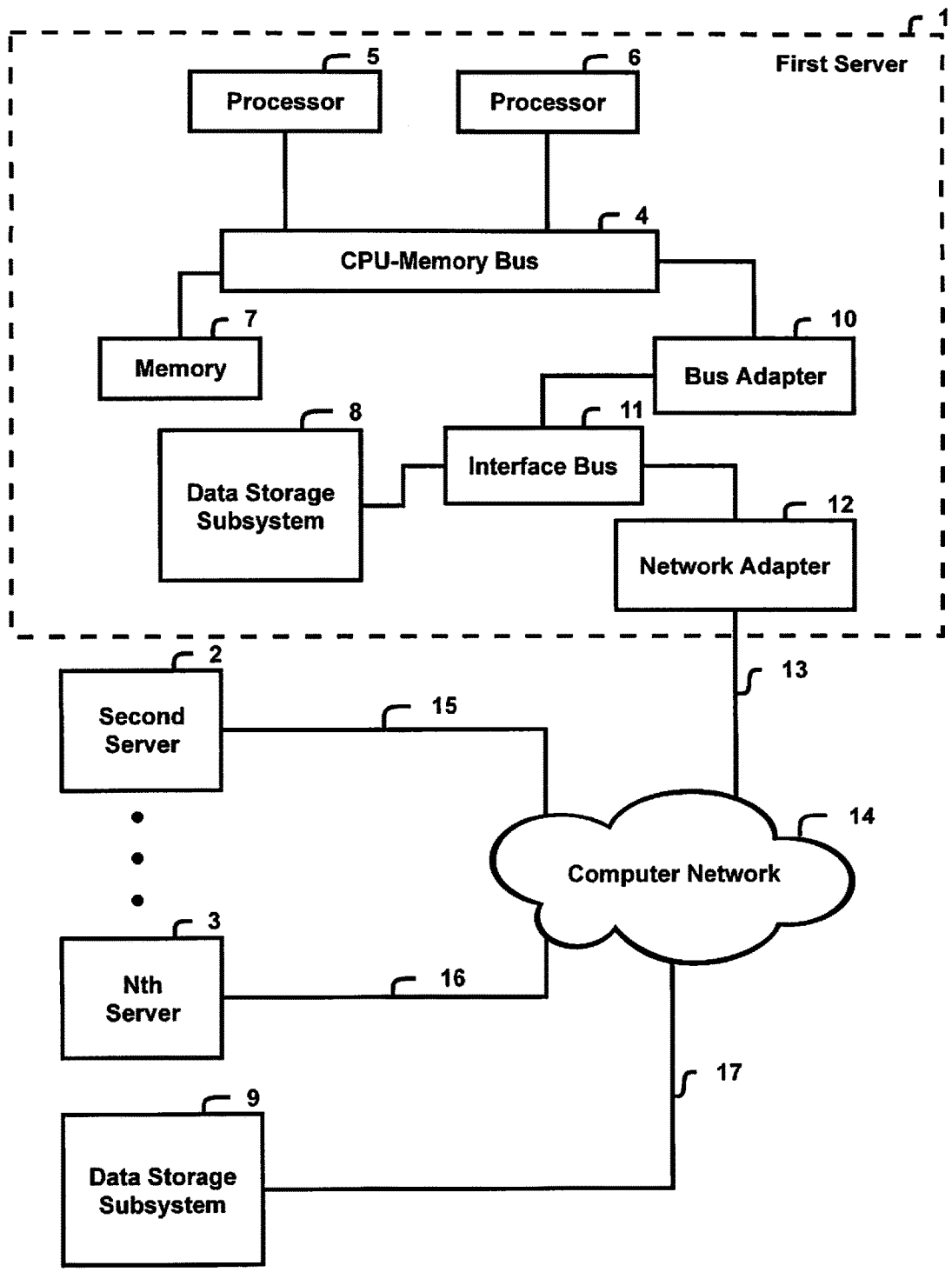
FIG. 1 illustrates hardware architecture of an embodiment of the invention.

FIG. 1 illustrates the hardware architecture of an embodiment of the invention. As shown, a cluster of servers can execute the software as described below. Each server is a computer that can communicate with data storage subsystems and with other computers. Servers can have various form-factors, including rack-based computers, desktop computers, laptop computers and mobile devices such as cell phones or tablets. Hennessy and Patterson, *Computer Architecture: A Quantitative Approach* (2012), and Patterson and Hennessy, *Computer Organization and Design: The Hardware/Software Interface* (2013), which are incorporated by reference herein, describe computer hardware and software, storage systems, caching, and networks.

As shown in FIG. 1, a first server 1, which is representative of the second server 2 through Nth server 3, includes a motherboard with a CPU-memory bus 4 that communicates with dual processors 5 and 6. The processor used is not essential to the invention and could be any suitable general-purpose processor running software (e.g. Intel Xeon), an ASIC dedicated to perform the operations described herein or a field programmable gate array (FPGA). Also, one could implement the invention using a single processor in each server or more than two processors to meet various performance requirements. The arrangement of the processors is not essential to the invention. Data is defined as including user data, instructions, and metadata. The processor reads and writes data to memory 7 and/or data storage subsystem 8 and 9 (e.g., a disk, disk array, and/or solid state disk). Each server includes a bus adapter 10 between the CPU-memory bus 4 and an interface bus 11. A non-transitory computer-readable medium (e.g., a suitable storage device, such as a hard disk drive, solid state disk (SSD), CD, DVD, USB storage device, secure digital card (SD) card, or floppy disk) can be used to encode the software program instructions described in the methods below.

Each server runs an operating system such as Apple's OS X, Linux, UNIX, a Windows OS, or another suitable operating system. Anderson, et al., *Operating Systems—Principles and Practice* (2014), and Bovet and Cesati, *Understanding the Linux Kernel* (2005), which are incorporated by reference herein, describe operating systems in detail.

In an embodiment, each server could be implemented on a virtual machine hosted by VMware, Hyper V, or open source software Xen. Lowe et al. *Mastering VMware vSphere* 5.5 (2013) describes the VMware virtualization software in detail and is incorporated by reference herein. Matthews et al., *Running Xen: A Hands-On Guide to the Art of virtualization* (2008) describes the free open source Xen virtualization software in detail and is incorporated by reference herein.

In various embodiments, the server can be implemented by one or more computers in a data center such as Amazon Web Services, Google Compute Engine, Microsoft Azure, or Rackspace. It is not essential to the invention that a particular data center be used. Murty, *Programming Amazon Web Services: S3, EC2, SQS, FPS, and SimpleDB* (2008) describes the Amazon Web Services in detail and is incorporated by reference herein. Sanderson, *Programming Google App Engine* (2012) describes the Google App Engine in detail and is incorporated by reference herein.

The first server 1 communicates through the network adapter 12 over a link 13 with a computer network 14 with other servers. Similarly, the second server 2 communicates over link 15 with the computer network 14, and the Nth server 3 communicates over link 16 with the computer network 14. In sum, the servers 1, 2 and 3 communicate with each other and with the computer network 14. A data storage subsystem 9 communicates over link 17 with computer network 14. The link 17, the link 15, the link 16, and the computer network 14 can be implemented using a bus, SAN, LAN, or WAN technology such as Fibre Channel, SCSI, InfiniBand, Ethernet, or Wi-Fi.

Figure 2:
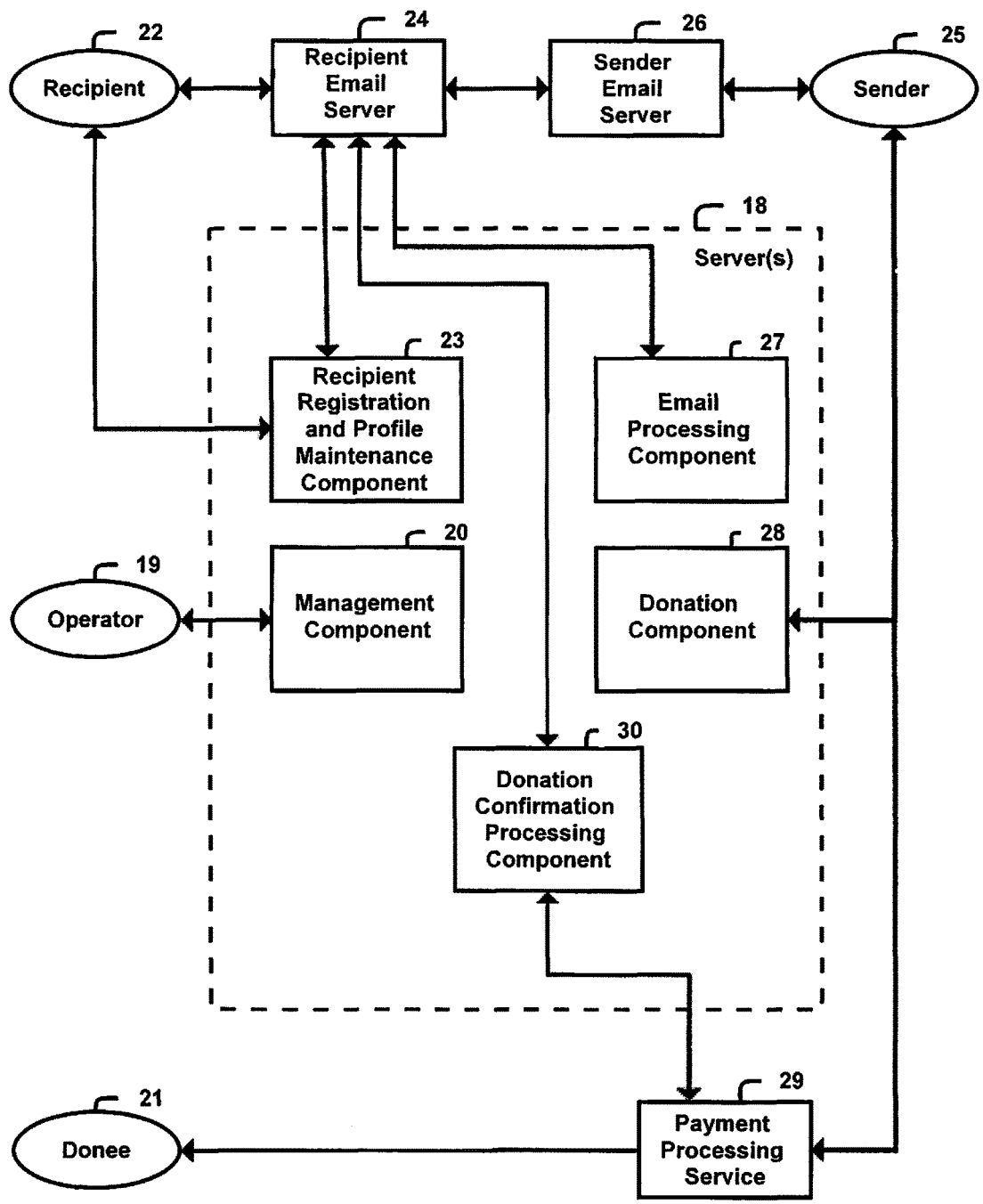
FIG. 2 illustrates software architecture of an embodiment of the invention.

FIG. 2 illustrates the software architecture of an embodiment of the invention. As illustrated, the system includes one or more servers 18 for handling email communication for one or more users who are recipients of email from a person or organization that they may or may not know (i.e., senders). The Wikipedia article Email, (2014), which is incorporated by reference herein, describes details of email messaging systems. Email systems have different organizational schemes to help recipients manage email messages. Some email systems such as Microsoft Outlook and Yahoo! Mail group the email messages in folders (e.g., inbox, drafts, sent items, outbox). Other email systems group the email messages using labels, categories, and tabs. For example, in Gmail, the inbox is a label that is partitioned into several categories by tabs (e.g. primary, social, and promotional).

The system facilitates maintaining a list of recipient-approved senders for each recipient, and, when receiving an email message from a sender that is not recipient-approved, sending a donation request on behalf of the recipient and storing the email message in a pending donation space of the recipient until a donation is made. It is my assumption that many email recipients would be more willing to invest their time in communicating with unknown senders if the senders first make a certain donation to a cause that is acceptable to both recipient and sender.

The system determines who is a recipient-approved sender based on previous email communication between the sender and the recipient and/or based on the recipient's email address book or contacts as provided in an email system such as Gmail or Microsoft Outlook. In an embodiment, the recipient can remove a sender from the recipient-approved sender list. The removal will then prevent the sender's email message from reaching the recipient's inbox without the sender making a donation A recipient's pending donation space segregates email from senders that are not recipient-approved, and can be implemented as a category, folder, label, and/or tab in recipient's email server and/or email client. In an embodiment, the recipient specifies the folder, label, and/or tab used as pending donation space. For example, a recipient may want email messages from senders not recipient-approved to go to a spam folder.

The physical storage of the email message is in the recipient's email server or in a data storage subsystem (e.g., data storage subsystem 9 in FIG. 1) that is accessible to the recipient's email server.

An operator 19 uses a management component 20 to store a list of service-approved donees 21. The list contains information about donees such the United Way, Task Force for Global Health, Feeding America, American Red Cross, or any service-approved person or organization. In an embodiment, there is no choice of donee (the server is configured to work with a single donee, and neither recipient nor sender have a choice of donees).

In an embodiment, the donee list is contained in a table in a database where each record contains information about a donee, e.g., the donee name, and payment information for a donation. Rockoff, *The Language of SQL: How to Access Data in Relational Databases* (2010), which is incorporated by reference herein, describes SQL databases in detail. Redmond et al., *Seven Databases in Seven Weeks* (2012), which is incorporated by reference herein, describe non-SQL databases in detail.

In another embodiment, the list is a file stored in a file system. In general, the list can be any data structure (e.g., a collection, including an array) suitable for storing one or more items in non-volatile (e.g. magnetic disc or solid state drive) or volatile memory such as RAM.

A recipient 22 uses a recipient registration and profile maintenance component 23 to register as a user of the system and to store the user's profile. In an embodiment, recipient 22 instructs the recipient email server 24 to provide component 23 with an access token for the recipient's email account on the recipient email server 24.

A sender 25 sends an email message to the recipient 22 through a sender email server 26 and the recipient email server 24. In an embodiment, the email server 24 includes software that identifies and filters spam and suspicious email message. Google, Yahoo!, Microsoft, Apple, and Earthlink all provide such software to filter email messages that are sent to their email customers. The Wikipedia article *Email filtering* (2014) and the article *Spam and suspicious email—Gmail Help* (2014), both incorporated by reference herein, describe details of email filtering.

Figure 9:
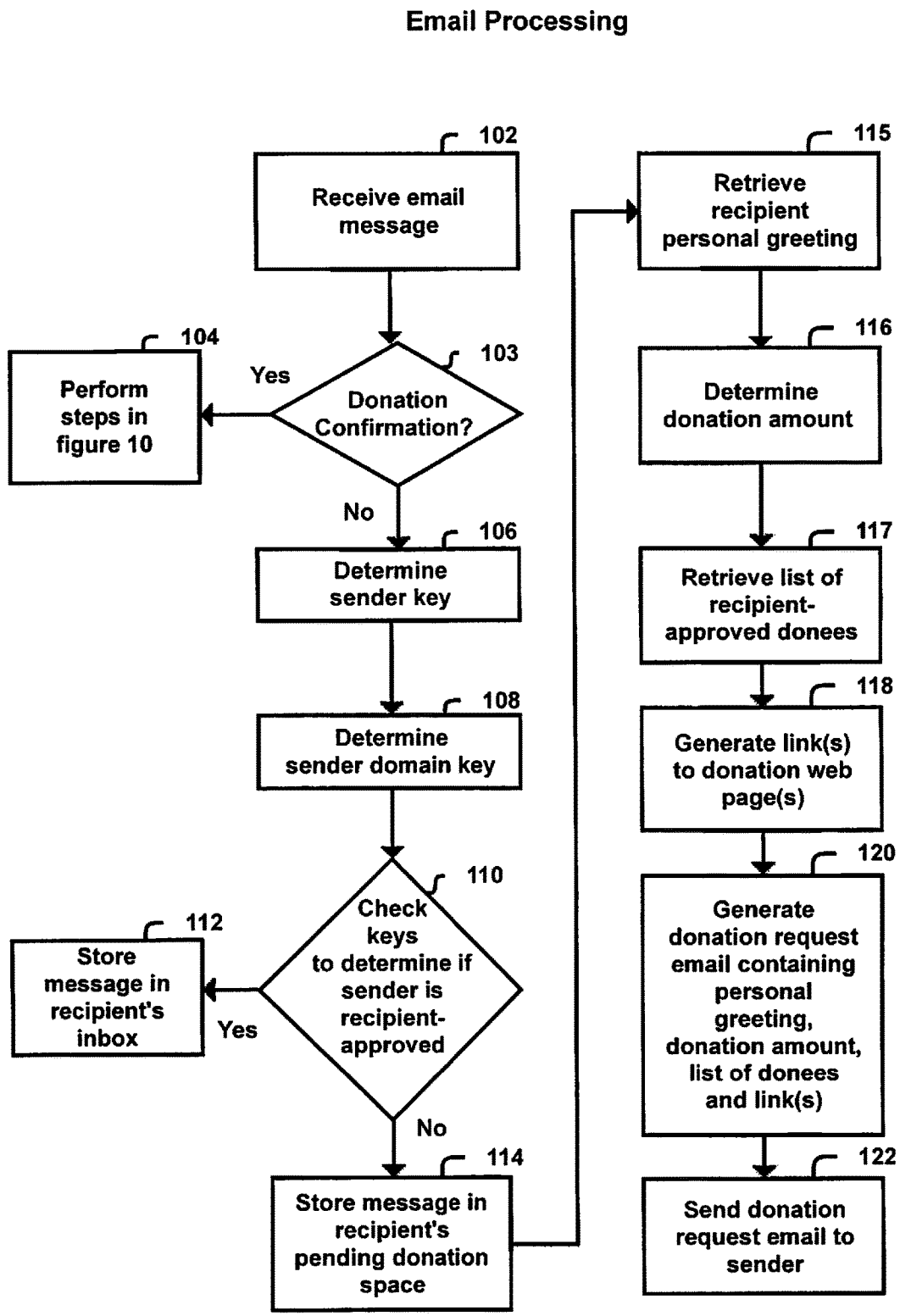
FIG. 9 illustrates various embodiments of email processing.

As also described in FIG. 9, an email processing component 27 receives and processes the email message. As part of the process, the email processing component 27 may send a donation request email message to the sender 25 through the recipient email server 24 and the sender email server 26.

The sender 25 uses a donation component 28 and a payment processing service 29 to make a donation to a donee 21. The payment processing service 29 can be any online payment processing service such as PayPal, Authorize.Net, or Google Wallet. As also described in FIG. 10, a donation confirmation processing component 30 receives a donation confirmation from the payment processing service 29 and stores the email message in a post donation space (e.g., inbox) in the recipient email server 24.

The software components 20, 23, 27, 28, and/or 30 can be based on a web application framework such as Ruby on Rails, ASP.Net, Play, or Django and be executed on one or more servers as illustrated in FIG. 1. In such distributed embodiments, each server executes one or more of the software components, and each software component is executed on one or more servers. The Wikipedia article *Web Application Framework* (2014), which is incorporated by reference herein, describes web application frameworks. Tanenbaum, *Computer Networks*, at pages 646-697 (2011) which is incorporated by reference, describe details of the Web.

Figure 3:
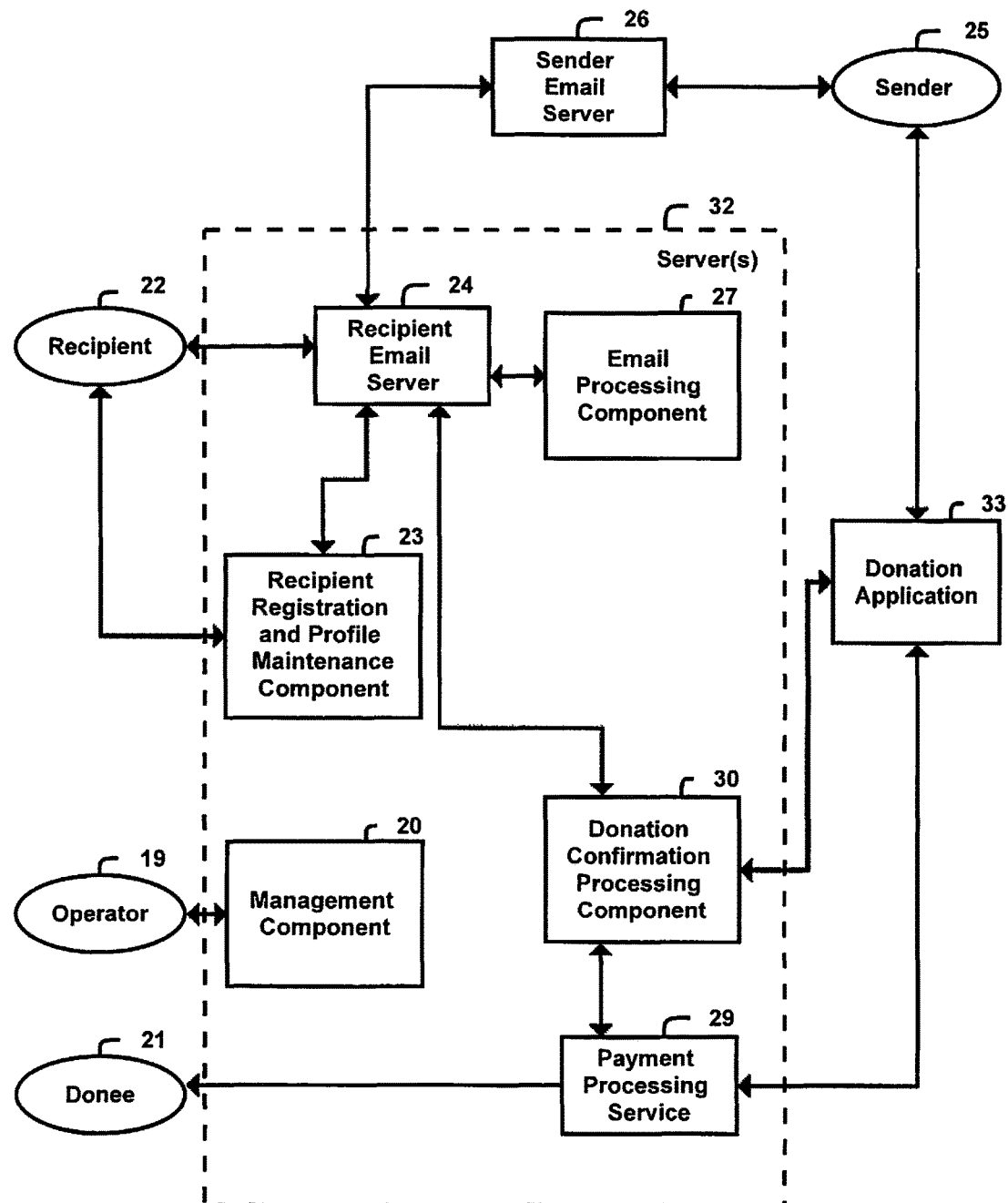
FIG. 3 illustrates software architecture of another embodiment of the invention.

FIG. 3 illustrates software architecture of another embodiment of the invention. As in FIG. 2, one or more servers 32 include a management component 20, a recipient registration and profile maintenance component 23, an email processing component 27, and donation confirmation processing component 30. Unlike FIG. 2, the server(s) 32 include a recipient email server 24 and a payment processing service 29. In addition, a donation application 33 external to the server(s) 32 replaces the donation component 28. Alternatively, the donation application 33 is executed in the server(s) 32. The donation application 33, performing the functions of the donation component 28 (FIG. 2), can be implemented as a web application, a mobile app, or a desktop application. A mobile app is an abbreviation for software that runs on a mobile device.

Figure 4:
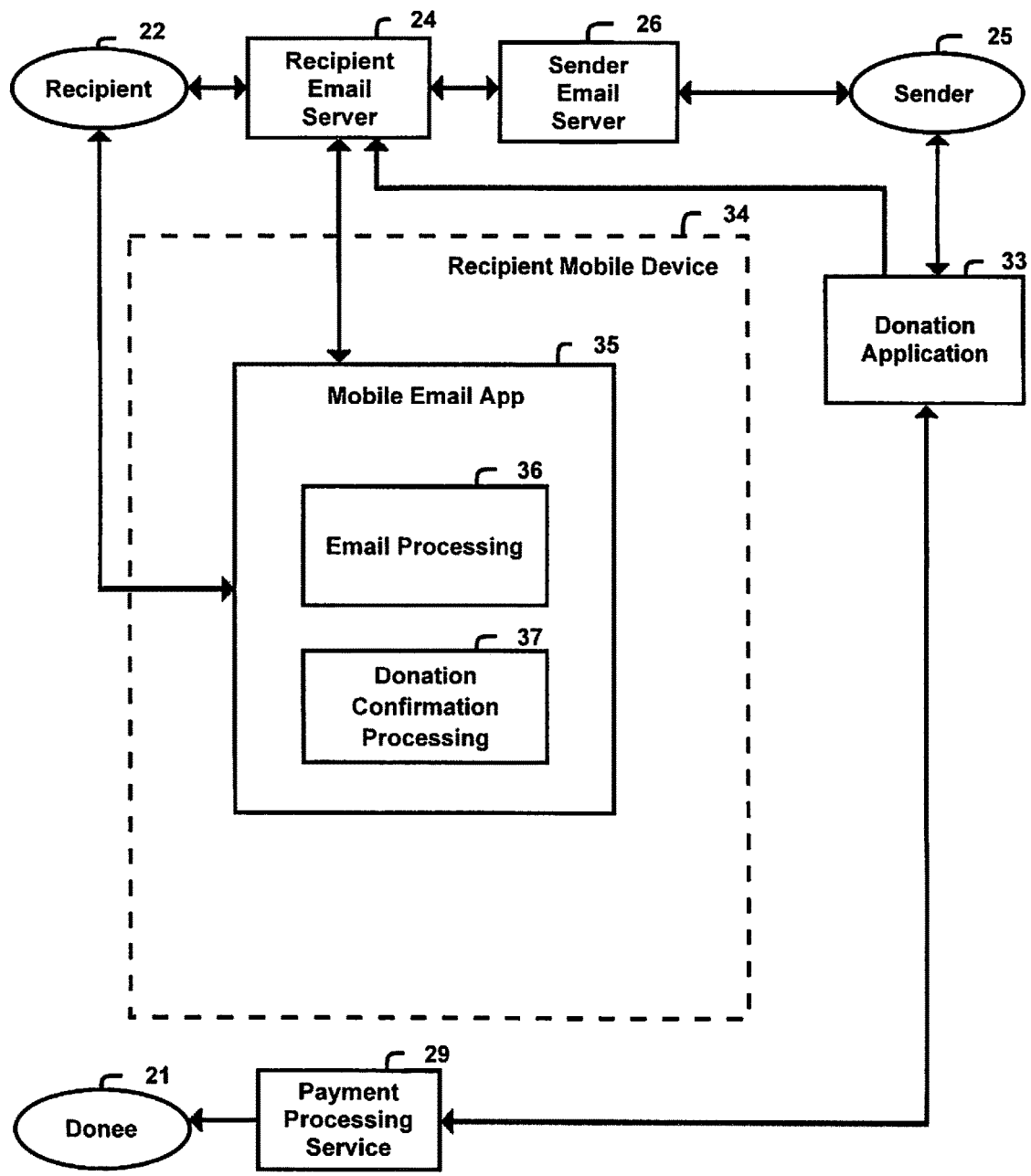
FIG. 4 illustrates an embodiment of the invention implemented as a mobile app.
Figure 10:
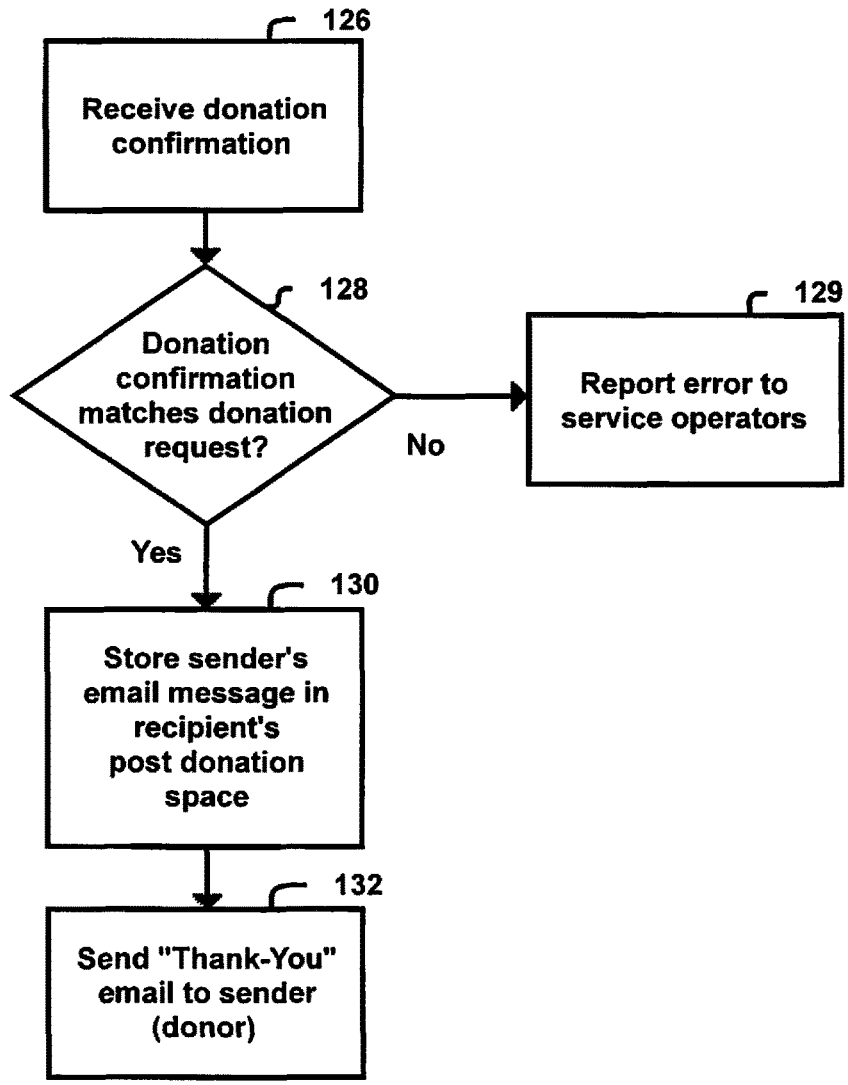
FIG. 10 illustrates various embodiments of donation confirmation processing.

FIG. 4 illustrates an embodiment of the invention implemented as a mobile app. In this embodiment, a mobile email app 35 receives email messages sent from a sender 25 through the sender email server 26 and the recipient email server 24 to the recipient 22 and invokes email processing 36 (FIG. 9) that checks if the sender is recipient-approved, and if not, sends a donation request to the sender 25. The sender 25 receives the donation request and uses a donation application 33 to make a donation. The donation application 33 performs the functions of the donation component 28 of FIG. 2. The donation application 33 sends a donation confirmation to the recipient 22 via email. The mobile email app 35 receives the donation confirmation and invokes donation confirmation processing 37 (FIG. 10).

One way to implement the email app 35 is to add email processing 36 and donation confirmation processing 37 to an existing email app such as the built-in email clients included in mobile operating systems (e.g. iOS, Android) or to a stand-alone email app such as K-9 mail (an open-source email app for Android, whose source code is available at https://github.com/k9mail/k-9). The article Excellent K-9 mail app for Android keeps your messages on a leash (2011) describes K-9 mail and is incorporated by reference herein. An open source email app is a useful for implementation because it is freely available to developers.

FIG. 5 illustrates an embodiment of recipient registration. In order for system to handle the email of a recipient, the recipient needs to first register with the system. As shown, at steps 38-39, the recipient uses a web browser to request and a server responds with registration web page(s) at the service web site. The registration web page(s) can be part of an AJAX application. Wikipedia's article *Ajax (programming)* (2014), incorporated by reference herein, describes Ajax programming. The registration web page(s) allow the recipient to enter and/or select various registration details (e.g., the recipient's name, one or more email addresses, a recipient-required donation amount, recipient-approved donees, and a personal greeting for the donation request email messages). In an embodiment, the registration details include the email address only, and the server uses, for all recipients, the same donation amount, the same donee, and no personal greeting in the donation request. A recipient-required donation amount is a donation amount set by the recipient as a minimum amount for donation by senders. In an embodiment, the registration details include a list of recipient-approved donees that the recipient can select from the list of service-approved donees.

At step 40, the recipient uses the browser to send registration details to the server. At step 41, the server stores the registration details in a database. When saving registration details the server assigns a recipient identifier for future reference to the recipient. In various embodiments, the recipient identifier is a sequence number, a random number, a normalized email address, or a hashed version of the recipient's normalized email address. An email address is normalized by converting characters to lower-case (or upper-case) and eliminating additional information sometimes included with the address (e.g., if the email address is "John Doe <JDoe@company.com>" the normalized email address is "jdoe@company.com").

At step 42, the server requests access to the recipient's email account(s) based on the registration details. In an embodiment, the request for access includes the step of the server redirecting the recipient's browser to the recipient's email service provider (e.g., Gmail, Yahoo!, Apple's iCloud, or Microsoft's Outlook in Office 365) for authorization. At step 44, the recipient uses the browser to instruct the email service provider to allow the system access to the recipient's email account. This results in the email service provider sending an access token to the server via the recipient's browser.

An access token is an object that the server can use to access the recipient's email account. In an embodiment, the access token is based on a protocol such as OAuth. The Internet Engineering Task Force (IETF) *Request for comments RFC* 6749 and Wikipedia's *OAuth* (2014) describe the details of the OAuth protocol, and both are incorporated by reference herein. In an alternative embodiment, the access token is the recipient's user name and password. In this embodiment, at step 42, the server presents a web page to the recipient's browser to allow entry of the recipient's user name and password; and at step 44, the recipient enters the user name and password in the web page and the browser sends them to the server. The web page can be part of an AJAX application. Wikipedia's article *Ajax (programming)* (2014), which is incorporated by reference herein, describes Ajax programming. At step 45, the server receives and stores the access token. In another embodiment (FIG. 3), steps 42-45 are not required, because the server has access to the recipient's email account.

Figure 11:
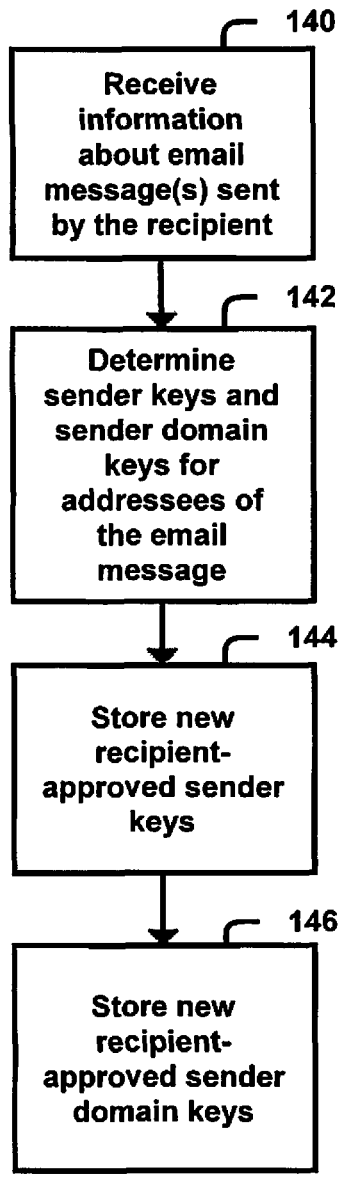
FIG. 11 illustrates an embodiment of automatic update of recipient-approved senders.
Figure 12:
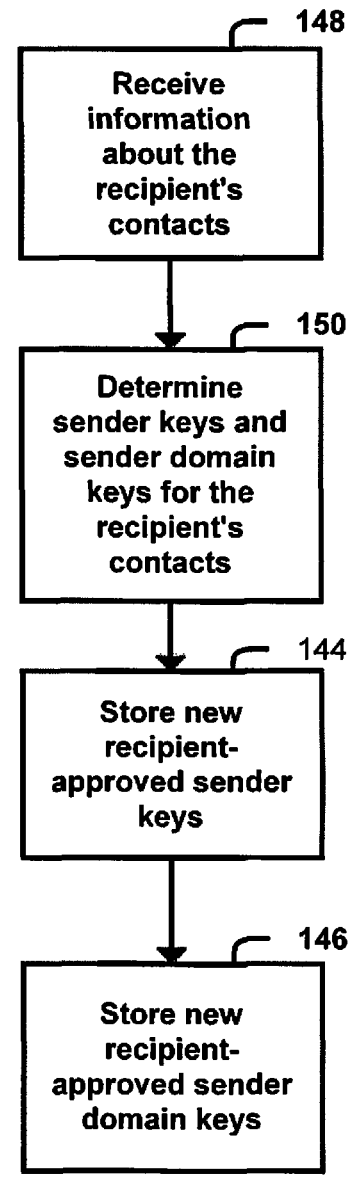
FIG. 12 illustrates another embodiment of automatic update of recipient-approved senders.

At step 46, the server receives and stores recipient-approved sender keys (FIGS. 11-12 illustrate methods of receiving and storing recipient-approved sender keys). In an embodiment, recipient-approved senders and recipient-approved sender domains are determined by accessing the recipient's contacts, so step 46 is not required. At step 48, the server performs the steps illustrated in FIGS. 9-10.

FIG. 6 illustrates an embodiment of registration detail updates. In order to keep the registration details up-to-date, the recipient uses a web browser to request at step 50 and a server responds at step 51 with web page(s) for updating registration details (part of the service web site). The web pages can be part of an AJAX application. Wikipedia's article *Ajax (programming)* (2014), incorporated by reference herein, describes Ajax programming. At step 52, the recipient uses the browser to edit the registration details (e.g., name, one or more email addresses, donation amount, approved donees, and personal greeting) and send the modified details to the server. At step 54, the server stores the updated registration details.

FIG. 7 illustrates an embodiment of donee management. As shown, the donee management process allows the list of service-approved donees to expand with recipient suggested donees (steps 56-66) or with service-approved donees (steps 55 and 64). At step 55, an operator uses a web browser to enter the details of a new service-approved donee. At step 64, the server stores the new donee information in the list of service-approved donees. At step 56, a recipient uses a web browser to enter the details of a new donee suggestion. At step 58, the server stores the donee details in a database. At step 60, the new donee is reviewed to determine if it should be approved. In an embodiment, the server initially compares the new donee to a list of rejected donees; and if the new donee was not previously rejected, an operator reviews the new donee to see if it should be approved and added to the service-approved donee list at step 64 or rejected and added to the list of rejected donees at step 66.

Figure 8:
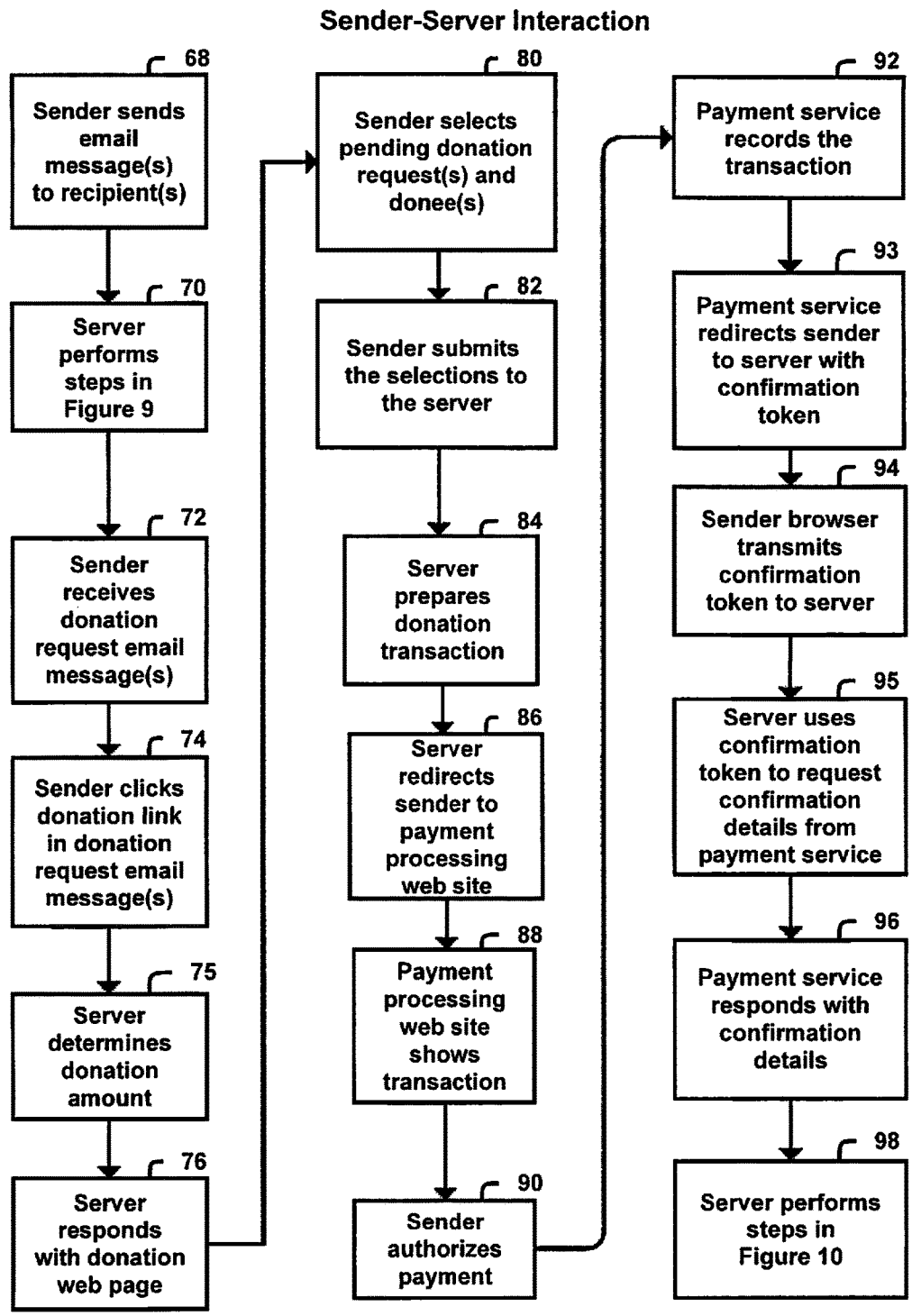
FIG. 8 illustrates various embodiments for interactions between the sender and the server.

FIG. 8 illustrates various embodiments for interactions between the sender and the server. After registration of one or more recipients is complete (FIG. 5), a sender sends email message(s) to recipient(s) at step 68. At step 70, the server 18 (FIG. 2) or the server 32 (FIG. 3) performs the steps shown in FIG. 9. At step 72, the sender receives one or more donation request email messages. In an embodiment, each donation request email includes at least one link to a web page that allows the sender to make a donation. At step 74, the sender clicks on a link in a donation request email. At step 75, the server determines a donation amount. In an embodiment, the donation amount is a single donation amount for all donation requests irrespective of the identity of the recipients, senders, or donees. In other embodiments, the donation amount is a specific donation amount (i.e., an amount that is specific to a donation request). In an embodiment, the specific donation amount is the recipient-required donation amount (see step 40, FIG. 5). In another embodiment, the server determines a specific donation amount based on recipient attributes (e.g. country), recipient email history, or other factors (e.g. the content of the message and/or information about the sender). For example, the server may automatically determine a higher donation amount for recipients that frequently receive messages from senders that are not recipient-approved. In another example, the server may determine a higher donation amount if the sender is known to send advertising materials via email. At step 76, the server responds with a donation web page that shows details of one or more donation requests (e.g. the recipient, the date and subject of the original message, the donation amount, and a list of donees).

In an embodiment, the donation web page can be part of an AJAX application. Wikipedia's article *Ajax (programming)* (2014), which is incorporated by reference herein, describes details of Ajax programming suitable for the donation web page. At step 80, the sender selects, in the donation web page, pending donation request(s), and for each pending donation request, a donee (e.g., a recipient-approved donee). In various embodiments, the web page shows the total donation amount based on the selected donation requests. In an alternative embodiment, the donation web page contains the details of a single donation request, and the sender selects a donee for that request if several donees are shown.

At step 82, the sender clicks on a submit button to send the selections made at step 80 to the server. At step 84, the server prepares a donation transaction based on the selected donee(s) and the required donation amount(s). In an embodiment, the transaction includes a donation-processing fee. At step 86, the server redirects the sender's browser to a payment processing service web site to allow the sender to complete the transaction. At step 88, the payment processing service (e.g., PayPal) web site displays the transaction details to the sender for final approval. At step 90, the sender authorizes the payment for donation(s). At step 92, the payment processing service records the transaction. At step 93, the payment processing service redirects the sender's browser to the server with a confirmation token included in the URL. At step 94, the sender's browser requests, from the server, the URL received in step 93, thereby transmitting the confirmation token to the server. At step 95, the server uses the confirmation token to request confirmation details from the payment processing service. At step 96, the payment processing service responds with confirmation details. At step 98, the server performs the steps illustrated in FIG. 10. *How to Make Parallel Payments Using Express Checkout* (2014) and *Implementing Parallel Payments* (2014), incorporated by reference herein, describe PayPal payment processing.

FIG. 9 illustrates various embodiments of email processing in a server or mobile app. At step 102, the server or mobile app receives an email message sent to the recipient. The email messages can be received using email protocols such as Simple Mail Transfer Protocol (SMTP), Internet Message Access Protocol (IMAP), Post Office Protocol (POP3), or an Application Programming Interface (API) like the Gmail application interface (API) described in https://developers.google.com/gmail/api/ and in the article *Introduction—Gmail API—Google Developers* (2014) which are incorporated by reference herein.

In receiving email messages using a polling-based protocol like IMAP and POP3, the server or mobile app is configured to repeatedly request new email messages from the recipient email server. The IMAP IDLE command can be used when available to make polling more efficient. Receiving email messages using a push-based protocol like the SMTP can be even more efficient. For SMTP access in the embodiment shown in FIG. 2, the recipient needs to configure his email account on the recipient email server 24 to forward all incoming email messages to the server 18.

Polling is not required in the server 32 shown in FIG. 3, because the recipient email server 24 receives email messages using SMTP.

In an embodiment, the server or mobile app ignores received email messages that the email server identified as spam or suspicious. This reduces the number of donation requests and the number email messages in the recipient's pending donation space.

In the mobile email app shown in FIG. 4, the method includes step 103, which checks if the email message includes a donation confirmation. In an embodiment, a donation confirmation is identified using a string or pattern that the donation application 33 (FIG. 4) includes in the email message. The string or pattern (e.g., donation_confirmation_23Z4234x23) can be included in the header, body or subject of the donation confirmation email message. The donation confirmation can be digitally signed and/or encrypted by the donation application. If the email message is a donation confirmation, the mobile app performs the steps of FIG. 10.

At step 106, the server or mobile app determines a sender key. In some embodiments, at step 108, the server or mobile app also determines a sender domain key.

A sender key is a representation of the sender of an email address. A sender domain key is a representation of the domain of the sender of an email address. In an embodiment, the keys in steps 106 and 108 are the email address (e.g., user@somecompany.com) and domain (e.g., somecompany.com) of the sender. Preferably, the email address and domain are normalized as described in step 41 of FIG. 5. In another embodiment, the keys are determined by concatenating the recipient identifier (see step 41) and the normalized email address or domain and applying a cryptographic hash function to the result. This results in a value that is unique in the system (across all recipients and senders) and can be used to efficiently check if a sender (or sender domain) is recipient-approved. Wikipedia's article *Cryptographic hash function* (2014), which is incorporated by reference herein, describes cryptographic hash functions.

At step 110, the server or mobile app checks the sender key and in an embodiment the sender domain key to determine if the sender is recipient-approved. A recipient-approved domain key prevents sending donation requests to senders from organizations with which the recipient is associated, such as an employer or customer company.

In an embodiment, the check is performed by retrieving the recipient's list of approved sender keys and the list of sender domain keys, and checking if the lists contain the sender or domain keys of the email message. In an embodiment, the check is performed without retrieving the lists using a database query such as "select 1 from approved_sender_keys where sender_key='980a6767fba3a'". In another embodiment, the sender key is the email address of the sender and checking if the sender's email address is in the recipient's contacts. In an embodiment, if the sender is recipient-approved, the server stores the email message in the recipient's inbox at step 112. In other embodiments, the message is known to already be stored in the recipient's inbox by the recipient's email server. If sender is not recipient-approved, the server or mobile app stores the email message in the recipient's pending donation space at step 114. In an embodiment, step 114 is not needed as the recipient's email server is known to store incoming messages in the pending donation space.

In a folder based email system such as Outlook, storing the email message in the recipient's inbox (step 112) constitutes saving the email message in the inbox folder if it's not already there. If the email message was previously saved in another folder, it needs to be moved to the inbox folder. In a label based system such as Gmail, storing the email in the recipient's inbox constitutes associating the inbox label with the email message (if not already associated) and disassociating the pending donation label from the email message (if previously associated). In an embodiment where the inbox is further segregated using categories or tabs, the server or mobile app associates the email message with the "Primary" category so that it appears in the user's primary inbox tab. More generally, the server or mobile app manipulates the email message so that it appears together with email messages from known senders like family, friends, and co-workers.

In an embodiment using email folders, storing an email message in the recipient's pending donation space (step 114) constitutes saving the email message in the pending donation folder, or moving it from another folder where it was previously saved. In an embodiment using categories, labels or tabs, storing an email message in the recipient's pending donation space constitutes associating the email message with a pending donation category, label, and/or tab. If the email message is associated with a category, label, or tab representing the recipient's inbox, the previous association needs to be removed to prevent the email message from being in the recipient's inbox and pending donation space at the same time.

In an embodiment, at step 115, the server or mobile app retrieves the recipient's personal greeting for the donation request email message. In an embodiment, at step 116, the server or mobile app determines a donation amount as described in step 75 (FIG. 8). In an embodiment, at step 117, the server retrieves the list of recipient-approved donees. At step 118, the server generates one or more links to donation web page(s). In an embodiment, the server generates a link to a donation web page that displays all of the recipient-approved donees. In another embodiment, the server generates for each recipient-approved donee a link to a separate donation web page. At step 120, the server generates a donation request email message containing the link(s). In an embodiment, the donation request email message also includes the recipient's personal greeting, the donation amount, and list of donees. At step 122, the server sends the donation request email message to the sender.

In the mobile email app shown in FIG. 4, steps 103-114 are performed before the mobile device displays or plays a new message notification to prevent avoid a new message notification for an email message that is stored in the pending-donation space.

FIG. 10 illustrates various embodiments of donation confirmation processing in a server or mobile app. At step 126, the server or mobile app receives a donation confirmation. At step 128, the server or mobile app checks if the donation confirmation matches the donation request. In an embodiment, all donation confirmations are assumed to match the donation request because the source of donation confirmation is trusted (e.g., the payment processing service 29 in FIG. 2). In an embodiment, if the donation confirmation doesn't match the donation request, an error is reported to the service operator(s) at step 129. At step 130, if the donation confirmation matches the donation request (or is assumed to match the donation request), the server or mobile app stores the sender's email message in a post donation space of the recipient. In an embodiment, the recipient's post donation space is the recipient's inbox and the process of storing the email message in the recipient's inbox is the same as in step 112 (FIG. 9).

In an embodiment where the post donation space is an email folder other than the inbox, the server or mobile app stores the email message in the recipient's post donation space by moving the email message from the pending donation folder to the post donation folder.

In a label based system like Gmail, the server or mobile app stores the email message in the post donation space by associating the email message with the post donation label and disassociating the pending donation label from the email message.

In an embodiment where the post donation space is defined as a tab, the server or mobile app manipulates the email message so that it appears within the post donation tab. More generally, the server or mobile app manipulates the email message so that it appears to the recipient in the space defined by the recipient or the service operator(s) to display email messages for which donations were made. At step 132, in an embodiment, the server sends a thank you email message to the sender, that is, the donor.

FIG. 11 illustrates an embodiment of automatic update of recipient-approved senders, in a server or mobile app, based on the recipient's sent email messages. The method can be performed during registration as well as on an on-going basis. The updating prevents donation requests being sent to people with whom the recipient is already communicating. At step 140, the server or mobile app receives information (e.g., the email header and/or body) about one or more email messages sent by the recipient. At step 142, the server or mobile app determines the sender key(s) and in some embodiments the sender domain key(s) for the addressees of the email message(s) as described in steps 106 and 108 (FIG. 9). At step 144, the server or mobile app stores new recipient-approved sender keys. At step 146, the server or mobile app stores new recipient-approved sender-domain keys. Steps 144 and 146 can be implemented in various ways. In an embodiment, recipient-approved sender keys and sender domain keys are stored in database tables where each record contains the recipient identifier, the sender or sender domain key, and the sender email address or sender's email domain. In an embodiment, sender domains with large numbers of recipients (e.g., gmail.com, yahoo.com) are ignored. In an embodiment, sender domain keys are stored only if the recipient has at least N recipient-approved senders within the domain, where N is a number is set by the recipient or an operator of the service (by default N=1). In another embodiment, step 146 is not performed, since sender domain keys are not used.

FIG. 12 illustrates an embodiment of automatic update of recipient-approved senders, in a server or mobile app, based on the recipient's email address book or contacts stored in the recipient's email server and/or the recipient's mobile device. The method can be performed during registration as well as on an on-going basis. The updating prevents donation requests being sent to contacts of the recipient. At step 148, the server or mobile app receives information (e.g., names and email addresses) about the recipient's contacts. At step 150, the server or mobile app determines the sender key(s) and in some embodiments the sender domain key(s) for the recipient's contacts as described in steps 106 and 108 (FIG. 9). At step 144, the server or mobile app stores new recipient-approved sender keys. At step 146, the server or mobile app stores new recipient-approved sender-domain. Various embodiments of steps 144 and 146 are described in the specification accompanying FIG. 11.

What is claimed:

1. A system for handling email communication, comprising:
   one or more servers configured to execute:
     a management component that stores a list of service-approved donees;
     a recipient registration and profile maintenance component that stores registration details of a recipient, including a recipient email address, a recipient-required donation amount, and a list of recipient-approved donees from the list of service-approved donees;
     an email processing component that (a) receives an email message, (b) determines a sender key representing a sender of the email message, (c) checks the sender key to determine if the sender is recipient-approved, and (d) if the sender is not recipient-approved, stores the email message in a pending donation space of the recipient and emails a donation request to the sender; and
     a donation confirmation processing component that receives a confirmation that the sender made a donation to a recipient-approved donee from the list of service-approved donees, that matches the recipient-required donation amount, and stores the email message in a post donation space of the recipient.

2. The system of claim 1, wherein the donation request includes a link to a web page that allows the sender to make a donation to a recipient-approved donee that meets the recipient-required donation amount.

3. The system of claim 1, wherein the one or more servers are further configured to execute a donation component that receives a request from the sender for a donation web page and responds with a web page that allows the sender to make a donation using a payment processing service.

4. The system of claim 1, wherein the recipient registration and profile maintenance component further stores a list of recipient-approved domain keys, and wherein the email processing component further performs the steps of determining a sender domain key, and checking the sender domain key to determine if the sender is recipient-approved.

5. The system of claim 1, wherein the recipient registration and profile maintenance component further performs the steps of receiving and storing a list of recipient-approved sender keys determined from contacts and/or sent email messages of the recipient, and wherein the sender key is checked against the list of recipient-approved sender keys to determine if the sender is recipient-approved.

6. The system of claim 1, wherein the recipient's post donation space is the recipient's inbox.

7. The system of claim 1, wherein the recipient registration and profile maintenance component further performs the steps of receiving and storing an access token for an email account of the recipient.

8. A computer-implemented method for handling email communication comprising executing on one or more servers the steps of:
   storing a list of service-approved donees;
   storing a list of recipient-approved donees, wherein the recipient-approved donees are on the list of service-approved donees;
   receiving an email message sent to a recipient;
   determining a sender key representing a sender of the email message;
   checking the sender key to determine if the sender is recipient-approved;
   if the sender is not recipient-approved, emailing a donation request to the sender, and if the email message is not already in a pending donation space of the recipient, storing the email message in the recipient's pending donation space;

receiving a confirmation that the sender made a donation, to a recipient-approved-donee, that matches the donation request; and storing the email message in a post donation space of the recipient.

9. The method of claim 8, wherein the recipient's post donation space is the recipient's inbox.

10. The method of claim 8, further comprising determining a specific donation amount, and wherein the confirmation is for a donation that matches the specific donation amount.

11. The method of claim 10, wherein the specific donation amount is a recipient-required donation amount.

12. The method of claim 8, wherein the donation request email includes a link to a web page that allows the sender to make a donation to a recipient-approved donee.

13. The method of claim 8, further comprising storing a list of recipient-approved domain keys, determining a sender domain key for the email message, and checking the sender domain key against the list of recipient-approved domain keys to determine if the sender is recipient-approved.

14. The method of claim 8, further comprising storing the email message in the recipient's inbox if the sender is recipient-approved.

15. The method of claim 8, further comprising receiving information about an email message sent by the recipient, determining a sender key for an addressee of the email message, and storing the sender key on a list of recipient-approved sender keys, and wherein the sender key is checked against the list of recipient-approved sender keys to determine if the sender is recipient-approved.

16. The method of claim 8, wherein the sender key is the sender's email address, and wherein the server determines if the sender is recipient-approved by checking if the sender's email address is in the recipient's contacts.

17. The method of claim 8, further comprising registering a recipient by performing the following steps:

receiving and storing recipient's one or more email addresses;

receiving and storing an access token for a recipient email account;

receiving and storing a list of recipient-approved sender keys; and receiving and storing a list of recipient-approved donees.

18. A non-transitory computer-readable medium for handling email communication, comprising instructions stored thereon that when executed on server(s) perform the steps of:

storing a list of service-approved donees;

storing a list of recipient-approved donees, wherein the recipient-approved donees are on the list of service-approved donees;

receiving an email message sent to a recipient;

determining a sender key representing a sender of the email message;

checking the sender key to determine if the sender is recipient-approved;

if the sender is not recipient-approved, emailing a donation request to the sender that includes a link to a web page that allows the sender to donate a specific donation amount to a recipient-approved donee, and storing the email message in a pending donation space of the recipient;

receiving a confirmation that the sender made a donation to a recipient-approved donee that matches the donation request; and storing the email message in a post donation space of the recipient.

19. The non-transitory computer-readable medium of claim 18, wherein the program further comprises storing a list of recipient-approved domain keys, determining a sender domain key for the email message, and checking the sender domain key against the list of recipient-approved domain keys to determine if the sender is recipient-approved.

20. The non-transitory computer-readable medium of claim 18, wherein the program further comprises storing the email message in the recipient's inbox if the sender is recipient-approved.

21. The non-transitory computer-readable medium of claim 18, wherein the program further comprises receiving information about an email message sent by the recipient, determining a sender key for an addressee of the email message, and storing the sender key on a list of recipient-approved sender keys.

\* \* \* \* \*